US012124690B2

(12) United States Patent
Takashiro et al.

(10) Patent No.: US 12,124,690 B2
(45) Date of Patent: Oct. 22, 2024

(54) ELECTRONIC DEVICE AND PROGRAM

(71) Applicant: Faurecia Clarion Electronics Co., Ltd., Saitama (JP)

(72) Inventors: Masashi Takashiro, Saitama (JP); Masashi Fujikawa, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 129 days.

(21) Appl. No.: 17/726,274

(22) Filed: Apr. 21, 2022

(65) Prior Publication Data

US 2022/0350473 A1 Nov. 3, 2022

(30) Foreign Application Priority Data

Apr. 28, 2021 (JP) ................................. 2021-076865

(51) Int. Cl.
*G06F 3/048* (2013.01)
*B60H 1/00* (2006.01)
(Continued)

(52) U.S. Cl.
CPC ....... *G06F 3/04847* (2013.01); *B60H 1/0065* (2013.01); *B60K 35/00* (2013.01);
(Continued)

(58) Field of Classification Search
CPC .............. G06F 3/0488; G06F 3/04883; G06F 3/04842; G06F 3/04886; G06F 3/0412;
(Continued)

(56) References Cited

U.S. PATENT DOCUMENTS

2007/0109279 A1* 5/2007 Sigona ................... G06F 3/0436
 345/177
2014/0300571 A1* 10/2014 Tomizu ............... G06F 3/04883
 345/173

(Continued)

FOREIGN PATENT DOCUMENTS

| EP | 1947555 A2 * | 7/2008 | ........... G06F 3/0488 |
| EP | 3422156 B1 * | 4/2022 | ............ B60K 35/00 |
| JP | 5933824 B2 | 6/2016 | |

*Primary Examiner* — Mohamed Abou El Seoud
(74) *Attorney, Agent, or Firm* — Volpe Koenig (57) ABSTRACT

An electronic device includes a storage unit storing adjustment information whereby the amount of change in a predetermined direction, when an adjustment portion was moved to adjust a setting for a predetermined system by the user performing a touch operation, has been associated with an amount of adjustment for adjusting the setting for the predetermined system. A control unit determines whether or not the user's touch operation has passed through a region in a predetermined amount of time, and calculates the amount of change in the predetermined direction based on the touch operation when it has been determined that the touch operation has passed through the region within the predetermined amount of time, determines the amount of adjustment corresponding to the calculated amount of change based on the adjustment information, and issues an instruction to the predetermined system to set a setting value based on the determined amount of adjustment.

8 Claims, 10 Drawing Sheets

(51) Int. Cl.
  *B60K 35/00* (2006.01)
  *G06F 3/04847* (2022.01)
  *G06F 3/04886* (2022.01)
  *B60K 35/10* (2024.01)
  *B60K 35/26* (2024.01)
  *G06F 3/01* (2006.01)

(52) U.S. Cl.
  CPC .......... *G06F 3/04886* (2013.01); *B60K 35/10* (2024.01); *B60K 35/26* (2024.01); *B60K 2360/1438* (2024.01); *G06F 3/016* (2013.01)

(58) Field of Classification Search
  CPC ...... G06F 3/165; G06F 3/03547; G06F 3/147; G06F 3/04186; G06F 3/04847; G06F 3/016; G06F 2203/014; G06F 3/0484; G06F 3/0486; B60H 1/0065; B60H 1/00985; B60K 35/00; B60K 2370/1438; B60K 2370/157; B60K 2370/1442; B60K 2370/1468; B60K 2370/168; B60K 37/06; B60K 35/10; B60K 35/26; B60K 2360/1438; B60K 35/28; B60K 2360/1442; B60K 2360/1468; B60K 2360/168

See application file for complete search history.

(56) References Cited

U.S. PATENT DOCUMENTS

| | | |
|---|---|---|
| 2016/0062626 A1 | 3/2016 | Kubota et al. |
| 2017/0197491 A1* | 7/2017 | Nakano ................ G06F 3/04847 |
| 2020/0174653 A1* | 6/2020 | Klein .................. G06F 3/04886 |

* cited by examiner

ELECTRONIC DEVICE AND PROGRAM

TECHNICAL FIELD

The present invention relates to a touch operation performed on a screen.

BACKGROUND ART

The latest in-vehicle devices are possible to adjust the temperature of the air conditioner, the air flow of the air conditioner, and the volume of sound equipment when a user moves a finger with touching a touch panel (a "touch operation" below). However, it can be difficult to perform touch operations without looking at the screen because the user cannot determine the layout of the icons for adjusting setting values such as the temperature without looking at the screen. It is also difficult to determine whether the intended touch operation has been performed without looking at the screen.

In response, an in-vehicle electronic device has been disclosed in which the volume can be easily increased or decreased (adjusted) using a volume switch displayed on a touch panel-type display unit (see Patent Document 1).

PRIOR ART DOCUMENTS

Patent Documents

[Patent Document 1]
JP 5933824 B2

SUMMARY OF THE INVENTION

Problem to be Solved by the Invention

In the technology disclosed in Patent Document 1, the user has to find and press a volume control button. While driving, touch operations should be performed as much as possible without having to look at a screen. Therefore, there is room for improving the method of accepting touch operations from users.

When absolute values are adjusted using a touch operation that does not require looking at a screen, fine adjustments are required. Therefore, the user has to concentrate on touch operations performed with a fingertip, and a driver's attention may be distracted.

In view of this situation, it is an object of the present invention to propose an in-vehicle device that allows for easy touch operations on a screen.

Means for Solving the Problem

In order to solve this problem, the present invention is an electronic device equipped with an interface unit having a region corresponding to a screen that is visible to a user and that can accept touch operations by the user in the region, the electronic device comprising: a storage unit that stores adjustment information in which the amount of change in a predetermined direction, when an adjustment portion has been moved to adjust a setting for a predetermined system by the user performing a touch operation, has been associated with an amount of adjustment for adjusting the setting for the predetermined system; and a control unit that determines whether or not the user's touch operation has passed through a region in a predetermined amount of time, calculates the amount of change in the predetermined direction based on the touch operation when it has been determined that the touch operation has passed through the region within the predetermined amount of time, determines the amount of adjustment corresponding to the calculated amount of change based on the adjustment information, and issues an instruction to the predetermined system to set a setting value based on the determined amount of adjustment.

In this configuration, the setting value of a predetermined system can be adjusted so that the setting of the predetermined system approximates the intended setting when the user performs a touch operation that passes through a region even if the user cannot look at the screen and touch the adjustment portion. For example, the user can adjust the setting value for a predetermined system without looking at the screen while driving.

Effect of the Invention

The present invention is able to realize an electronic device that is very convenient.

EMBODIMENT OF THE INVENTION (I) Embodiment

An example of the present invention will now be described in detail. However, the present invention is not limited to this embodiment. In this embodiment, an example of an electronic device will be described as an in-vehicle device.

In the region where touch operations are valid, the in-vehicle device according to the present embodiment uses a first vibration indicating a touch operation within the region, in combination with a second vibration different from the first vibration indicating a touch operation (finger) is located in the region.

In the in-vehicle device adjusts a setting value of a predetermined system by an absolute value, when the user performs a direct touch operation to the region where a touching operations are valid. Also, in the in-vehicle device adjusts a setting value of a predetermined system by a relative value, when the user's touch operation is across the region within a predetermined time.

The embodiment of the present invention will now be described with reference to the drawings. The following description and the drawings are used to explain the present invention. In order to make the description clearer, omissions and simplifications are used where necessary. The present invention can be embodied in different ways. Unless otherwise specified, each of the components may be singular or plural.

In the following description, identical components in the drawings are indicated by the same reference numbers and further description of these components has been omitted. When describing the same type of component without differentiating, reference numbers are used without their suffix number. When differentiating among the same type of component in the description, the reference numbers are used with their suffix number. For example, "region 710" is used when describing regions without differentiating, and "region 710-1" is used when differentiating between individual regions in the description.

Expressions such as "first", "second", and "third" are used in the present specification to identify components, and do not necessarily limit the number or order of the components. Also, the numbers used to identify components are contextual, and a number used in one context does not necessarily mean the component has the same configuration in another context. A component identified by a number does not prevent the component from being combined with the functions of a component identified by another number.

Figure 1:
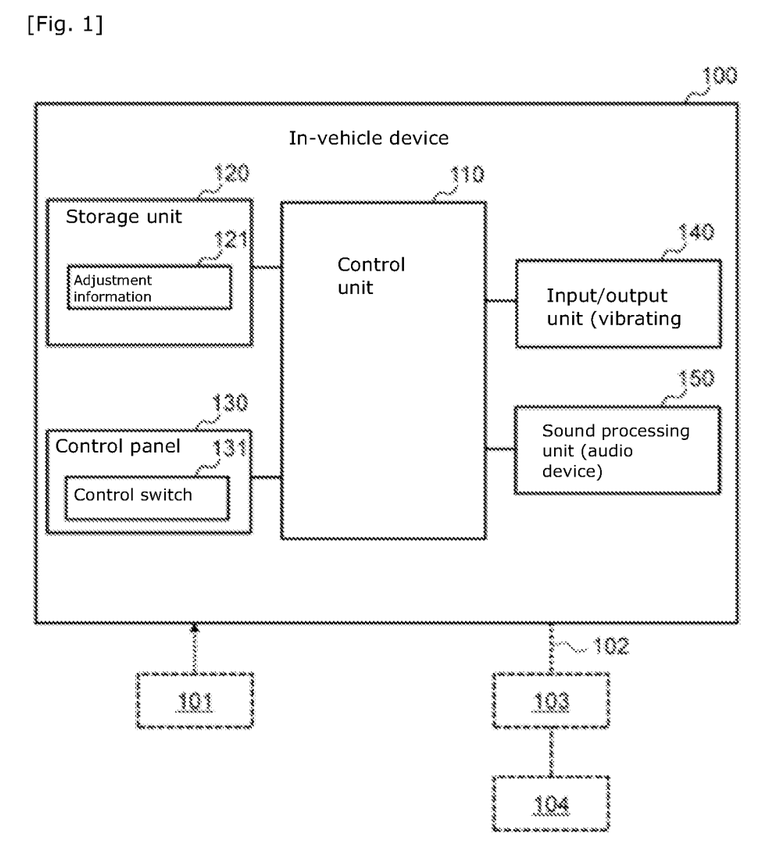
FIG. 1 is a diagram showing an example of a configuration for the in-vehicle device.

In FIG. 1, 100 indicates the in-vehicle device in the present embodiment.

For example, the in-vehicle device 100 can be mounted in the dashboard of the vehicle. The in-vehicle device 100 accepts at least one of a touch operation for adjusting the temperature of the air conditioner installed in the vehicle ("temperature adjustment" below), a touch operation for adjusting the air flow of the air conditioner installed in the vehicle ("air flow adjustment" below), and a touch operation for adjusting the volume of the audio equipment installed in the in-vehicle device 100 or the vehicle itself ("volume adjustment" below). In the following description, touch operations for adjusting the temperature will be used. However, air flow adjustments and temperature adjustments will be described when appropriate. In the following description, the audio equipment is installed in the in-vehicle device 100.

As shown in FIG. 1, the in-vehicle device 100 includes a control unit 110, a storage unit 120, a control panel 130, an input/output unit 140, and a sound processing unit 150.

The control unit 110 includes a CPU (central processing unit), a ROM (read-only memory), a RAM (random-access memory), a communication interface, and peripheral circuits, and controls each component in the in-vehicle device 100.

For example, the control unit 110 outputs signals for setting the temperature of the air conditioner to the air conditioner in response to a touch operation in order to control the temperature of the air conditioner. The control unit 110 also outputs signals for setting the air flow from the air conditioner in response to a touch operation to the air conditioner in order to control the air flow from the air conditioner. The control unit 110 also outputs signals for setting the volume of the audio equipment in response to a touch operation to the sound processing unit 150 in order to control the volume of the audio equipment.

The storage unit 120 includes non-volatile memory and stores different types of data. For example, the storage unit 120 stores adjustment information 121. The adjustment information 121 will be described later with reference to FIG. 3.

The control panel 130 includes one or more control switches 131. The control panel 130 detects operation of a control switch 131 and outputs signals corresponding to the operation to the control unit 110. The control unit 110 executes the processing corresponding to the operation based on signals inputted from the control panel 130.

The input/output unit 140 is used to input and output various types of information. The control unit 110 expands image data of an image to be displayed on the input/output unit 140 in a frame memory, and displays the image on the input/output unit 140 based on the image data expanded in the frame memory. The input/output unit 140 can also include a vibration device that is able to output vibrations, and vibrations are outputted by the vibration device in response to instructions from the control unit 110. The input/output unit 140 will be described later with reference to FIG. 2.

For example, the sound processing unit 150 includes an audio equipment. More specifically, the sound processing unit 150 includes a digital-to-analog converter, a volume circuit, an amplifier circuit, and a loudspeaker. In response to instructions from the control unit 110, the sound processing unit 150 performs digital-to-analog conversion on audio signals inputted from the control unit 110 using the digital-to-analog converter, adjusts the volume level using the volume circuit, amplifies the level using the amplifier circuit, and outputs sound and voice, etc. from the loudspeaker.

The functions of the in-vehicle device 100 are not limited to a temperature adjusting function, an air flow adjusting function, and a volume adjusting function. For example, the in-vehicle device 100 can be equipped with a GPS unit, a relative orientation detecting unit, a beacon receiving unit, an FM multiplex receiver unit, a wireless communication unit, and a media control unit. In this case, the in-vehicle device 100 is equipped with a function that detects the current position of the vehicle, a function that displays the current position of the vehicle on a map, a function that searches for a route to a destination, and a function that display the route to the destination on a map to guide the vehicle along the route to the destination.

For example, the functions of the in-vehicle device 100 may be realized by the CPU reading a program stored in the ROM into a RAM and executing the program (software), by hardware such as dedicated circuits, or by a combination of software and hardware. Note that a single function of the in-vehicle device 100 may be divided into a plurality of functions, or a plurality of functions may be combined into a single function. Also, some of the functions of the in-vehicle device 100 may be provided as separate functions or may be included in other functions. In addition, some of the functions of the in-vehicle device 100 may be realized by another computer that is able to communicate with the in-vehicle device 100.

The program mentioned above that is related to the function (and control) of the in-vehicle device 100 may be provided via a recording medium such as a CD-ROM 101 or via data signals over the internet. The in-vehicle device 100 may receive a program via a CD-ROM 101. The vehicle-mounted device 100 may also have a function for connecting with a communication line 102. In this case, the computer 103 is a server that provides the program, and the program is stored in a recording medium such as a storage device 104. The communication line 102 can be a communication line for the internet, personal computer communication, or a dedicated communication line. The computer 103 retrieves the program from the storage device 104 and transmits the program to the in-vehicle device 100 via the communication line 102. In other words, the computer 103 transmits the program as data signals on carrier waves over the communication line 102. In this way, the program can be supplied as a computer-readable computer program product in various forms, such as on a recording medium or as data signals (carrier waves).

Figure 2:
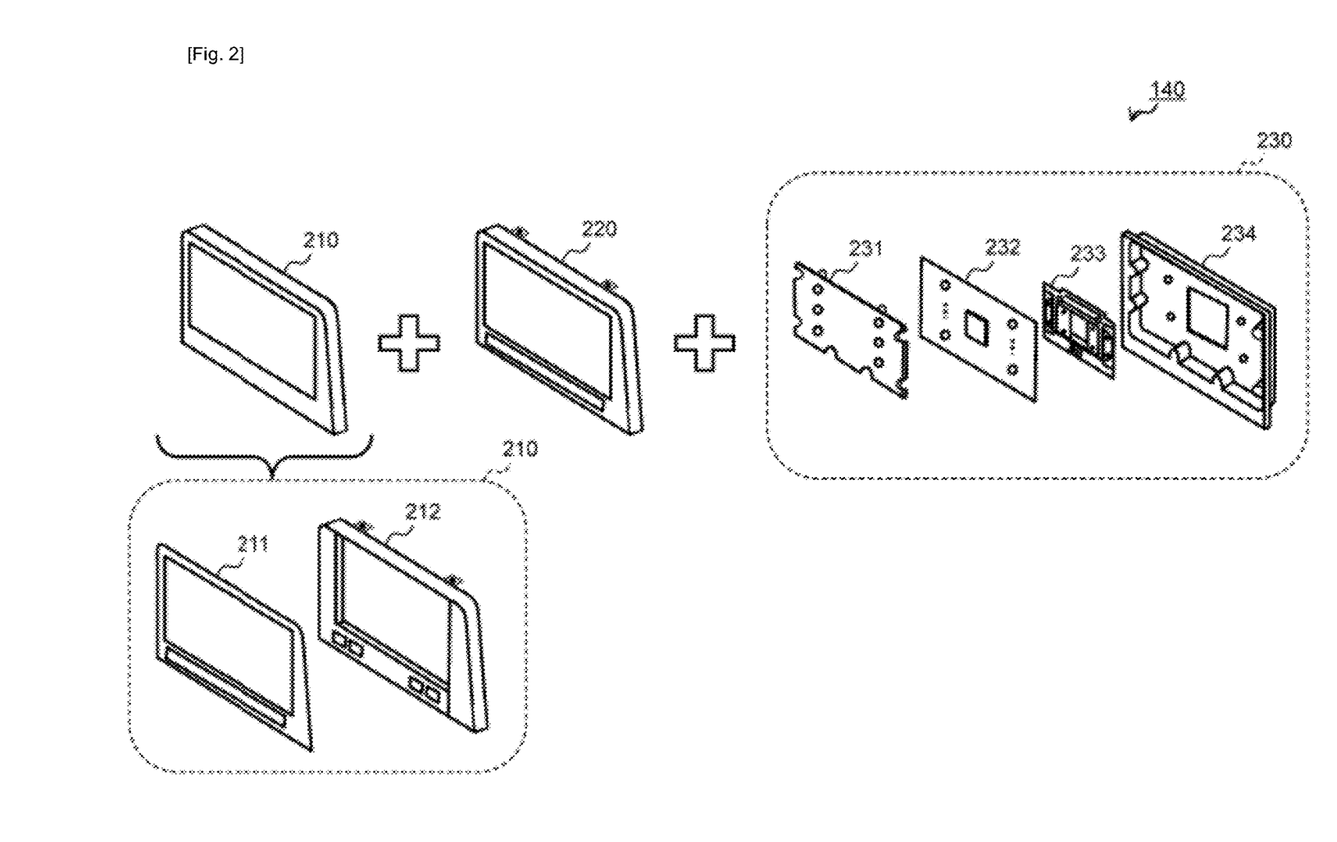
FIG. 2 is a diagram showing an example of a configuration for the input/output unit.

FIG. 2 is a diagram showing an example of a configuration for the input/output unit 140. The input/output unit 140 includes an escutcheon unit 210, a movable unit 220, and a fixed unit 230.

The escutcheon unit 210 is the case for the input/output unit 140. The escutcheon unit 210 includes a touch panel 211 and a display panel 212.

For example, the touch panel 211 can be composed of pressure-sensitive or electrostatic input detection elements. When the touch panel 211 is touched, the touch panel 211 outputs signals indicating the touched position to the control unit 110. The touch operation includes an operation performed by touching a predetermined position of the touch panel 211 with an indicator such as the tip of a finger. The display panel 212 can be, for example, a liquid crystal display (LCD).

When signals indicating the touched position are inputted from the touch panel 211, the control unit 110 detects, based on the inputted signals, the coordinates of the touched position (simply the "coordinates" below) in a predetermined coordinate system for representing positions in the display region of the display panel 212 as coordinates. For example, the control unit 110 can identify the coordinates of a touched position as XY coordinates on the screen displayed on the display panel 212.

The movable unit 220 is a component that transmits vibrations generated on the fixed unit 230 side to the escutcheon unit 210.

For example, the fixed unit 230 can be a vibrating device that generates vibrations. More specifically, the fixed unit 230 includes a shield 231, a board 232, a vibrating member 233, and a case 234. The shield 231 is an electrode cover that suppresses noise from the board 232. The board 232 can be a control board on which a microcomputer has been mounted. The vibrating member 233 is a component that vibrates based on instructions from the board 232. The case 234 is a cover that houses the shield 231, the board 232, and the vibrating member 233 on its back surface.

Figure 3:
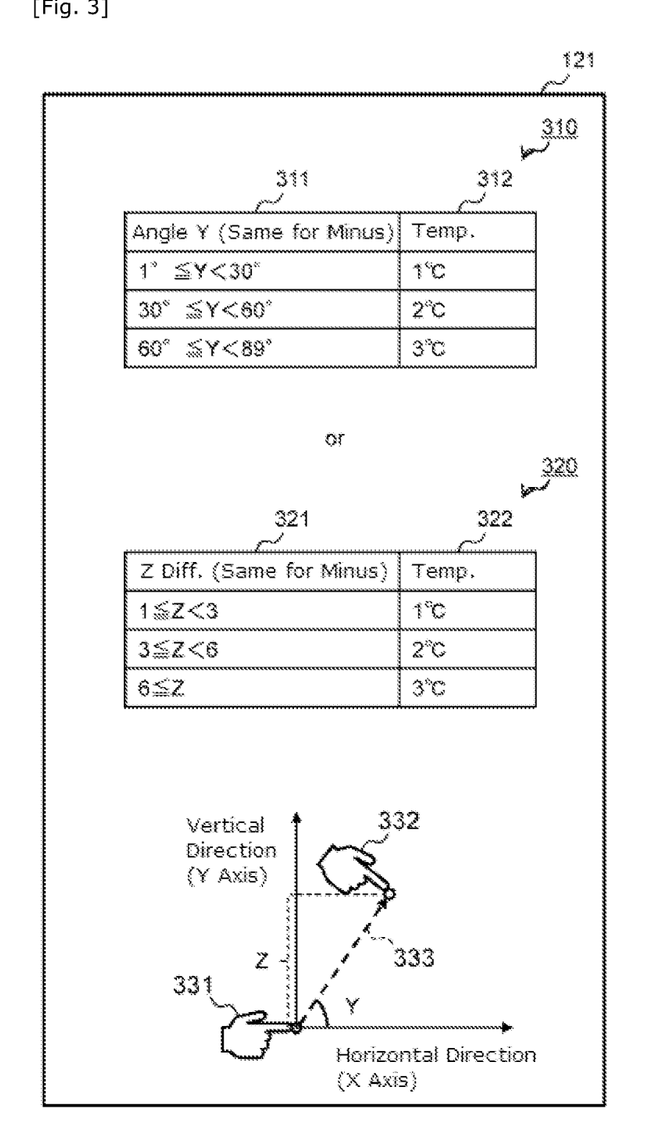
FIG. 3 is a diagram showing an example of adjustment information.

FIG. 3 is a diagram showing an example of adjustment information 121 (adjustment table 310 and adjustment table 320). The adjustment information 121 includes one or both of adjustment table 310 and adjustment table 320.

The adjustment table 310 stores a record containing the values of a plurality of items indicating adjustment information 121. More specifically, the adjustment table 310 stores a record in which angle 311 and temperature 312 information have been associated.

The angle 311 indicates a range of angles including angles (angle Y) formed by a vector 333 connecting a start point 331 of the touch operation and the end point 332 of the touch operation and the horizontal direction (X-axis). The temperature 312 indicates the range of temperature adjustments (increase or decrease) to the air conditioner corresponding to the range of angles. For example, when angle Y is "+10°", the angle Y belongs to the "1°≤Y<30°" range for the angle 311. Therefore, the first record is selected and an adjustment is made to raise the temperature of the air conditioner by "1° C." for the temperature 312. A detailed explanation for when angle Y is negative will be omitted. However, when angle Y is "−10°", the temperature can be lowered by "1° C.".

The adjustment table 320 stores a record containing values for a plurality of items indicating adjustment information 121. More specifically, the adjustment table 310 stores a record in which difference 321 and temperature 322 information have been associated.

The difference 321 indicates a range of differences for the vertical difference (difference Z) between the start point 331 of a touch operation and the end point 332 of the touch operation. Temperature 322 indicates the extent of the temperature adjustment (increase or decrease) to the air conditioner in the range of differences. For example, when difference Z is "+2", the difference Z belongs to the "1≤Z<3" range for the difference 321. As a result, the first record is selected to raise the temperature of the air conditioner by "1° C." for the temperature 322. A detailed explanation for when difference Z is negative will be omitted. However, when difference Z is "−1", the temperature can be lowered by "1° C.".

Figure 4:
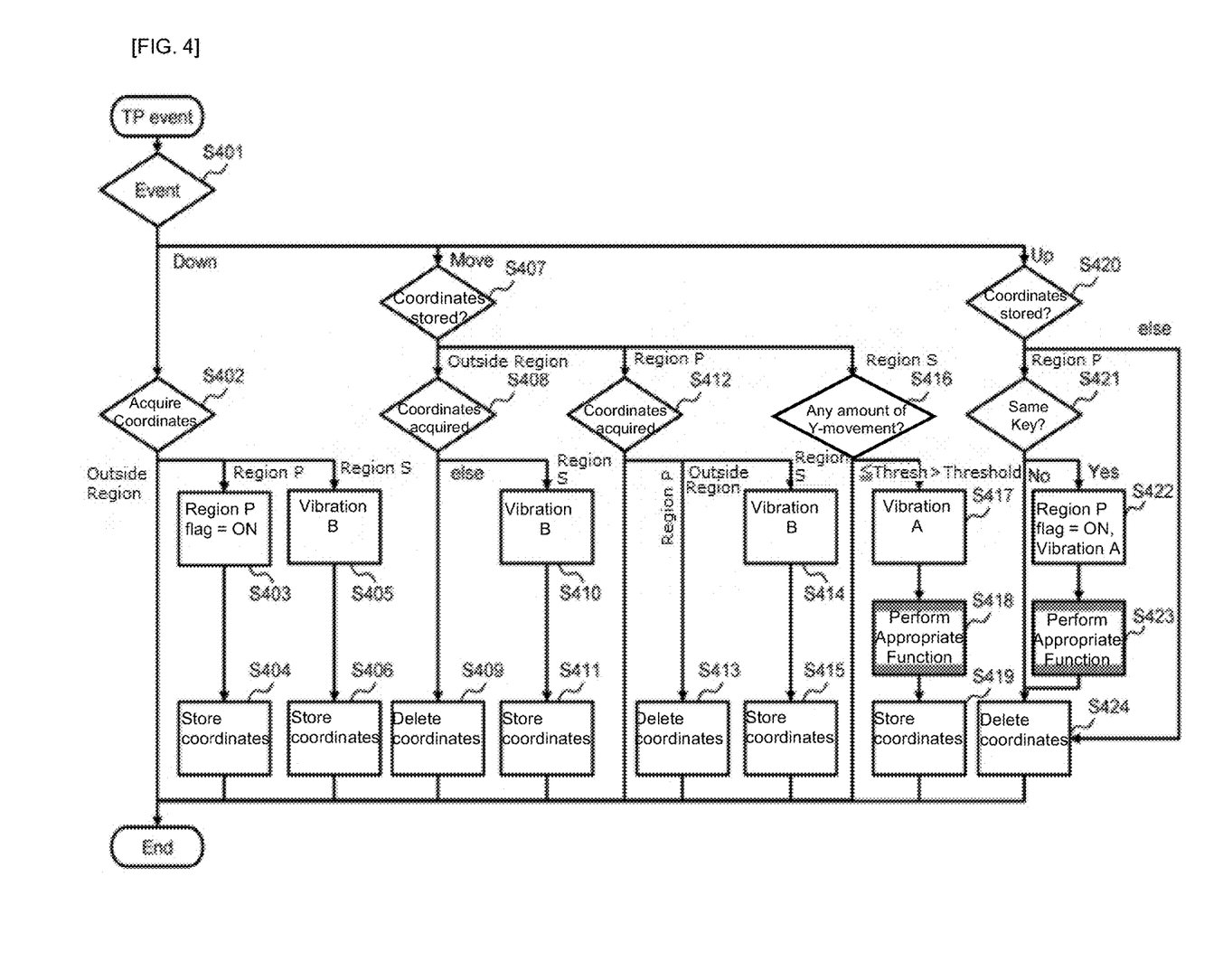
FIG. 4 is a diagram showing an example of vibration control processing.
Figure 5:
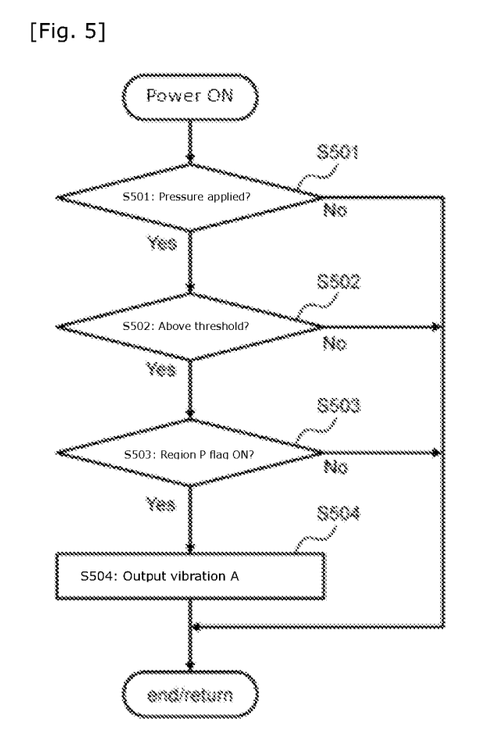
FIG. 5 is a diagram showing an example of vibration control processing.

FIG. 4 and FIG. 5 are diagrams showing an example of a process (vibration control process) related to feedback for vibration of the vibrating member 233 in response to a touch operation. The vibration control process will be described with reference to the screens displayed on the display panel 212 in FIG. 7 and FIG. 8 when appropriate.

Figure 7:
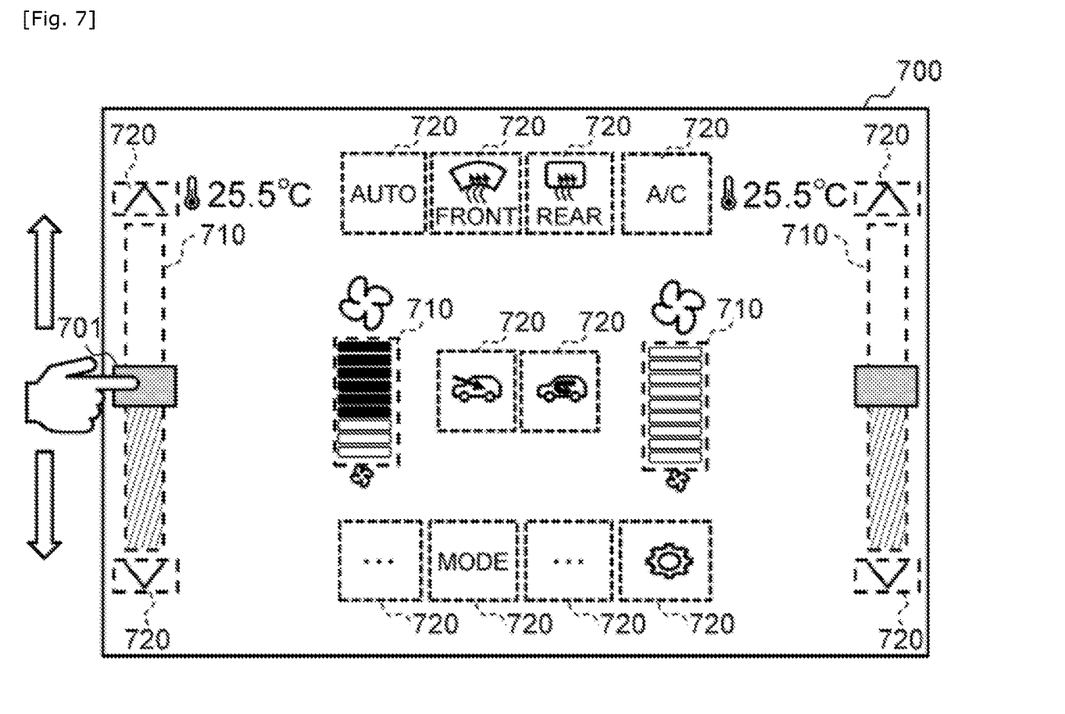
FIG. 7 is a diagram showing an example of a control screen.

For example, the display panel 212 displays the control screen 700 in FIG. 7 when the power is turned on. The control screen 700 is provided with a region 710 that can accept sliding touch operations ("region S" below) and a region 720 that can accept pressing touch operations ("region P" below). In region S, sliding touch operations are valid. For example, the user can adjust the temperature by moving a knob 701 provided in region S in the vertical direction (a "knob operation" below). Region S cannot accept touch operations from outside of region S. In region P, pressing touch operations are valid. For example, the user can use a desired function by pressing region P as if it were a conventional button.

When no clues are provided for adjusting the temperature by touching the touch panel 211, the user has difficulty determining what touch operation has been performed without glancing at the control screen 700.

In response, the input/output unit 140 in region S of the control screen 700 outputs vibration A indicating a touch operation in region S and a vibration B indicating a touch operation located in region S. Vibration A and vibration B differ at least in terms of the frequency of the vibrations, the amplitude of the vibrations, or the direction of the vibrations. For example, (A1) to (A5) below can be performed properly by using coarse and strong vibrations for vibration A and fine and weak vibrations for vibration B.

(A1) When the knob is operated in region S as shown in FIG. 7, vibration A is outputted based on the amount of movement. For example, when region S has been divided by multiple increments and a touch operation has been performed in three of the increments, the input/output unit 140 outputs vibration A each time the finger moves into a new increment (three times in total).

(A2) When the finger is kept in place without being released after a touch operation has been detected in region S, the input/output unit 140 continues to output vibration B intermittently (for example, every 500 ms).

Figure 8:
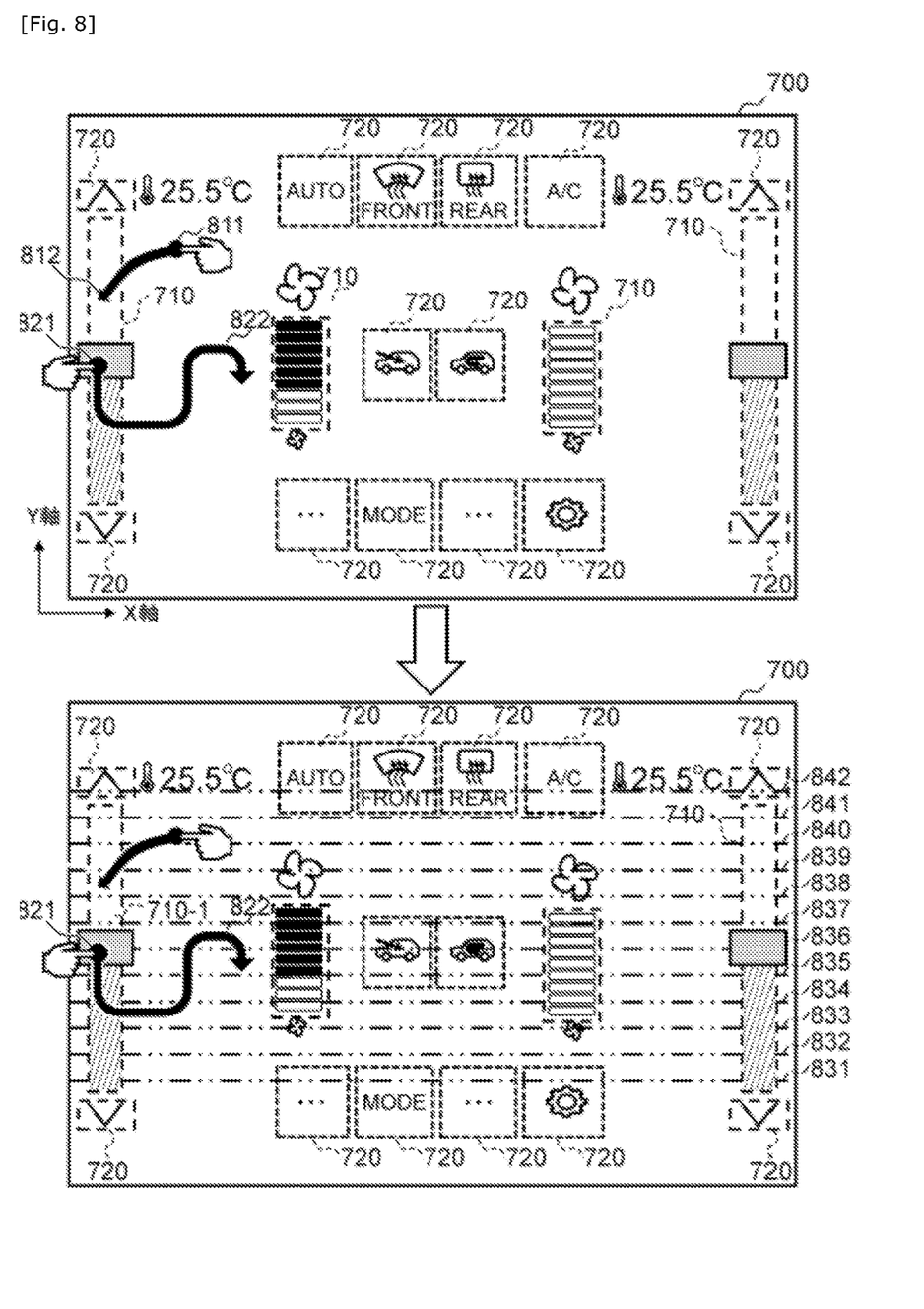
FIG. 8 is a diagram showing an example of a control screen.

(A3) When the input/output unit 140 detects that the finger is located from point 811 outside the region S to point 812 inside the region S as shown in FIG. 8, vibration B is outputted once. Afterward, either (A2) or (A4) is performed.

(A4) When the finger goes to point 822 outside of region S without the finger being removed from point 821 in region S, movement in the Y-axis direction (vertical direction) on the control screen 700 is continuously monitored until the finger is released, and vibration A is outputted in the same way as when the knob 701 is moved linearly.

(A5) In region P, the input/output unit 140 outputs vibration A once each time a touch operation is performed. For example, when the region P is pressed while monitoring for pressure sensitivity, the input/output unit 140 may output vibration A once each time the finger is released from region P.

An example of processing (vibration control processing) performed to execute these properly will now be explained using FIG. 4 and FIG. 5.

FIG. 4 is a diagram showing an example of vibration control processing related to the touch sensor in the touch panel 211. Step S401 is executed when an event is detected during a predetermined cycle (for example, every 500 ms).

In step S401, the control unit 110 performs processing according to the event that has occurred, that is, a touch operation on the touch panel 211. When the event that has occurred is a touching touch operation, that is, when the user's finger touches the touch panel 211 after not touching the touch panel 211, or when the user's finger is touching the touch panel 211 and is not moving, the control unit 110 advances the process to step S402. When the event that has occurred is a sliding touch operation, the control unit 110 advances the process to step S407. When the event that has occurred is a releasing touch operation, that is, when the user's finger touching the touch panel 211 has been removed, the control unit 110 advances the process to step S420.

In step S402, the control unit 110 acquires the coordinates on the display panel 212 where the touch operation (user's finger) is located on the touch panel 211, and performs processing based on the coordinates that have been acquired ("acquired coordinates" below). When the acquired coordinates are coordinates outside of region P and region S ("outside the region" below), the control unit 110 ends the process. When the acquired coordinates are coordinates in region P, the process advances to step S403. When the acquired coordinates are coordinates in region S, the process advances to step S405.

In step S403, the control unit 110 turns ON a flag (the "region P flag" below) indicating that the touch operation performed on the touch panel 211 is located in region P.

In step S404, the control unit 110 stores the acquired coordinates in the storage unit 120, and ends the process.

In step S405, the control unit 110 issues an instruction to the fixed unit 230 to output vibration B once. The fixed unit 230 outputs vibration B in response to the instruction from the control unit 110. By outputting vibration B in step S405, the user can grasp that the touch operation occurred in region S without having to glance at the control screen 700.

In step S406, the control unit 110 stores the acquired coordinates in the storage unit 120, and ends the process.

In step S407, when the coordinates stored in the storage unit 120 ("stored coordinates" below) are not coordinates in region P or region S, the control unit 110 advances the process to step S408. When the stored coordinates are coordinates in region P, it advances to step S412. When the stored coordinates are coordinates in region S, it advances to step S416.

In step S408, when the acquired coordinates are not coordinates in region S, that is, when it has been determined that the touch operation is outside of the region or the touch operation has moved from outside of the region to the region P, the control unit 110 advances the process to step S409. When the acquired coordinates are coordinates in region S, that is, when it has been determined that the touch operation has moved from outside of the region into region S, the control unit 110 advances the process to step S410.

In step S409, the control unit 110 discards the stored coordinates and ends the process.

In step S410, the control unit 110 issues an instruction to the fixed unit 230 to output vibration B once. The fixed unit 230 outputs vibration B in response to the instruction from the control unit 110. By outputting vibration B in step S410, the user can grasp that the touch operation has moved into region S without having to glance at the control screen 700.

In step S411, the control unit 110 stores the acquired coordinates in the storage unit 120, and ends the process.

When the acquired coordinates are the coordinates in region P, that is, when it has been determined that the touch operation is in region P, the control unit 110 ends the process in step S412. When the acquired coordinates are outside of the region, that is, when it has been determined that the touch operation has moved from region P to outside the region, the control unit 110 turns OFF the region P flag and advances the process to step S413. When the acquired coordinates are in region S, that is, when it has been determined that the touch operation has moved from region P to region S, the control unit 110 turns OFF the region P flag and advances the process to step S414.

In step S413, the control unit 110 discards the stored coordinates and ends the process.

In step S414, the control unit 110 issues an instruction to the fixed unit 230 to output vibration B once. The fixed unit 230 outputs vibration B in response to the instruction from the control unit 110. By outputting vibration B in step S414, the user can grasp that the touch operation has moved into region S without having to glance at the control screen 700.

In this way, when the user's touch operation moves from outside region S to region S in step S410 and step S414, the control unit 110 issues an instruction to the fixed unit 230 (one example of a vibrating unit) to output vibration B (the second vibration). In this configuration, the user can grasp that the touch operation has entered region S when the touch operation has moved, even when the touch operation is performed near region S, without having to glance at the control screen 700.

In step S415, the control unit 110 stores the acquired coordinates in the storage unit 120, and ends the process.

In step S416, when the amount of movement between the stored coordinates and the acquired coordinates in the Y-axis direction (the "Y movement amount" below) is less than or equal to a threshold value (for example, the length of one increment), the control unit 110 ends the process. When the Y movement amount is greater than the threshold value, the control unit 110 advances the process to step S417.

In step S417, the control unit 110 issues an instruction to the fixed unit 230 to output vibration A once. The fixed unit 230 outputs vibration A in response to the instruction from the control unit 110.

As described above, the touch panel 211 (one example of an interface unit) has a region S divided into several sections corresponding to the control screen 700 that can be viewed by the user, and that can accept user touch operations performed in region S. Also, the fixed unit 230 (one example of a vibrating unit) outputs vibration A and vibration B via the user's tactile sense in response to instructions from the control unit 110. At the same time, the sound processing unit 150 (one example of a vibrating unit) may output sound A or sound B via the user's hearing sense, in a manner similar to the fixed unit 230. Note that sound A and sound B differ at least in terms of sound pressure (amplitude), pitch (frequency), or timbre (waveform).

More specifically, in step S410 and step S417, the control unit 110 instructs the fixed unit 230 to output vibration A (the first vibration) each time the user's touch operation moves between increments (sections), instructs the fixed unit 230 to output vibration B (the second vibration) which is different from vibration A at a predetermined time interval while a user touch operation is detected in any of the increments. In this configuration, since vibration A is outputted each time a touch operation moves between increments, the user can grasp that the intended touch operation has been performed in region S without any eye movement. Also, in this configuration, since vibration B is outputted at a predetermined time interval while a touch operation is detected in a given increment, the user can grasp that the touch operation is currently located in region S without any eye movement.

In step S418, the control unit 110 instructs the air conditioner to adjust the temperature by one increment when an operation (for example, a function operation) calls for adjusting the temperature of the air conditioner by one increment (for example, 1° C.). The air conditioner sets the temperature setting for the air conditioner according to this instruction from the control unit 110.

Thus, each increment is associated with a setting for the air conditioner (one example of a predetermined system). The control unit 110 instructs the air conditioner to change the setting to the value corresponding to the most recent increment each time the user's touch operation moves between increments. In this configuration, the user can move the touch operation within region S and change the setting of the air conditioner without having to glance at the control screen 700.

In step S419, the control unit 110 stores the acquired coordinates in the storage unit 120, and ends the process.

Here, as shown in FIG. 8, region S (region 710-1 in this example) may be divided by a plurality of virtual lines (virtual lines 831 to 842) provided at equal intervals in the horizontal direction on the control screen 700. Note that, when region S accepts sliding touch operations in the left-right direction, the virtual lines may be provided at equal intervals in the vertical direction.

For example, in step S416 to step S419, the control unit 110 does not discard the stored coordinates when the touch operation moves out of region S, the control unit 110 can instruct the fixed unit 230 to output vibration A each time the user touches a virtual line even when the user's touch operation has moved from region S to outside region S. In this configuration, the user can continue the intended touch operation without having to be concerned about whether the touch operation leaves region S, even when the touch operation leaves region S because the user is not looking at the control screen 700.

When it has been determined that a user touch operation detected outside region S has moved into region S, the control unit 110 instructs the air conditioner to change the set value based on the position of the touch operation because coordinates are stored in step S411 and step S415. In this configuration, the user can change the set value based on the position of a touch operation by moving the touch operation in the vertical direction when the user starts a touch operation outside region S without glancing at the control screen 700 and has determined that the touch operation is in region S based on vibration B etc. indicating that the touch operation is inside region S.

In step S420, the control unit 110 advances the process to step S421 when the stored coordinates are coordinates in region P, and advances the process to step S424 when the stored coordinates are not coordinates in region P.

In step S421, the control unit 110 advances the process to step S422 when the region indicated by the acquired coordinates is the same region (same key) as region P indicated by the stored coordinates, and advances the process to step S424 when it is not the same key.

In step S422, the control unit 110 turns OFF the region P flag and instructs the fixed unit 230 to output vibration A once. The fixed unit 230 outputs vibration A in response to the instruction from the control unit 110. The vibration outputted in step S422 does not have to be vibration A. For example, vibration C may be outputted which is different from both vibration A and vibration B.

In step S423, the control unit 110 instructs the device performing a function to perform the function, when the function corresponding to region P is to be performed (function operation). The device performs the function in response to an instruction from the control unit 110.

In step S424, the control unit 110 discards the stored coordinates and ends the process.

FIG. 5 is a diagram showing an example of vibration control processing related to a pressure sensitive sensor in the touch panel 211. Step S501 is executed when the control unit 110 receives a signal from the pressure sensitive sensor.

When the control unit 110 determines in step S501 that a pressing operation has been performed based on a signal from the pressure sensitive sensor, the process advances to step S502. When it has been determined that no pressing operation has been performed, the process ends.

When the control unit 110 determines in step S502 that the pressure value is equal to or greater than a threshold value based on signals from the pressure sensitive sensor, the process advances to step S503. When it has been determined that the pressure value is less than the threshold value, the process ends.

In step S503, the control unit 110 advances the process to step S504 when the region P flag is ON, and ends the process when region P flag is not ON.

In step S504, the control unit 110 instructs the fixed unit 230 to output vibration A once, and then ends the process. The fixed unit 230 outputs vibration A in response to the instruction from the control unit 110. The vibration outputted in step S504 does not have to be vibration A. For example, vibration C may be outputted which is different from both vibration A and vibration B.

In FIG. 4 and FIG. 5, the vibrating unit used to output vibrations is a fixed unit 230 that can vibrate the input/output unit 140. In this configuration, since the input/output unit 140 that accepts touch operations vibrates, the user can feel the vibrations directly with a finger and can more reliably recognize whether a certain touch operation has been performed than from sound, or vibrations transmitted via the sense of hearing.

However, the vibrating unit does not have to be a fixed unit 230. For example, a sound processing unit 150 may be used instead of a fixed unit 230. Since sound is outputted from the sound processing unit 150 in this configuration, the input/output unit 140 does not have to be vibrated, and the impact of vibrations on the input/output unit 140 on the in-vehicle device 100 can be reduced.

Here, if no clues are provided when adjusting the temperature by touching the touch panel 211, the user cannot understand the layout of the icons without glancing at the control screen 700 and touch operations performed to adjust the temperature are more difficult.

Figure 9:
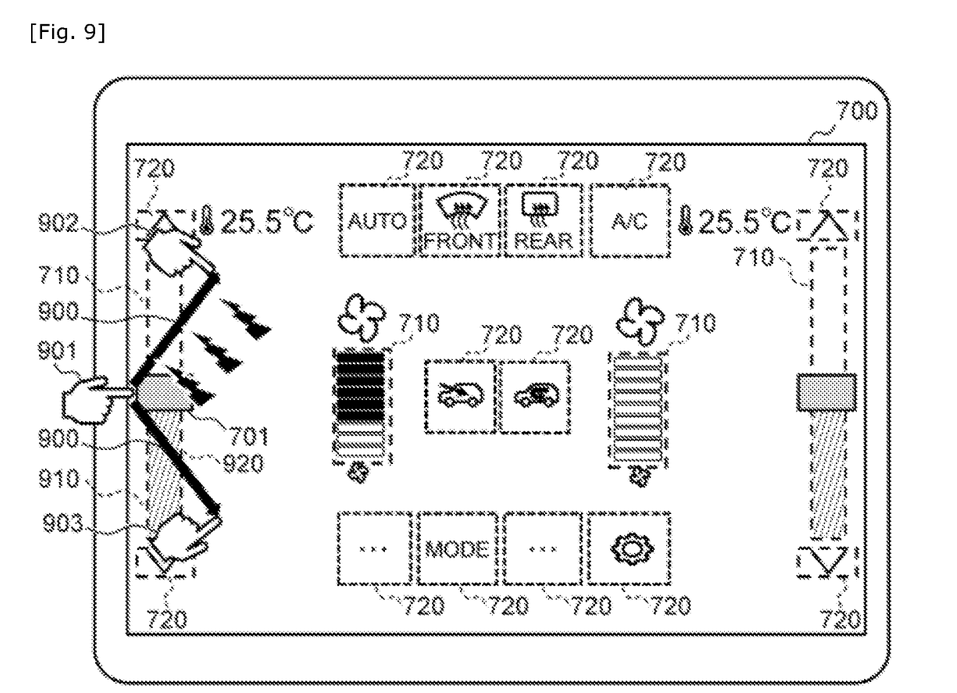
FIG. 9 is a diagram showing an example of a control screen.

In response, as shown in FIG. 9, in region S of the control screen 700, the input/output unit 140 detects a touch operation 900 that crosses region S (a "passing operation" below) in addition to a knob operation. When a knob operation is detected, the control unit 110 adjusts the temperature using absolute values, and when a passing operation is detected, it adjusts the temperature using relative values.

For example, as explained with reference to step S416 and step S418, when region S is directly touched and the knob is operated, the control unit 110 can adjust the temperature using absolute values. In this case, the user can operate the knob up to the upper and lower limits of HI or LO. Also, for example, when a passing operation is detected from the outer frame of the control screen 700 into the control screen 700, the control unit 110 calculates the inclination of the passing operation in the Y-axis direction, and vibrates the input/output unit 140 and adjusts the temperature based on the calculated result. Here, region S provided with the knob 701 is arranged within a predetermined distance (for example, 1 to 2 mm) of the edge of the control screen 700. In this configuration, because a touch operation starting outside region S can be detected even when region S is provided along the edge of the control screen 700, it can be determined whether or not a touch operation has passed through region S.

More specifically, when region S is crossed by a touch operation from the outer frame of the control screen 700 within a predetermined amount of time or a touch operation from inside the control screen 700 crosses region S and reaches beyond the control screen 700, the control unit 110 adjusts the temperature according to the amount of change in the Y-axis direction as a relative value (for example, 1 to 3° C.). The control unit 110 can, for example, adjust the temperature using method (B1) or (B2) below.

(B1) The control unit 110 calculates the inclination (angle Y) of a virtual line in the Y-axis direction, where the virtual line connects the point where a touch by the user's finger is detected (for example, start point 901) to the point where the touch is removed (for example, the end point 902), and adjusts the temperature based on the calculated result and an adjustment table 310 created and stored in advance.

(B2) The control unit 110 calculates the amount of movement in the Y-axis direction (difference Z between the Y-coordinates at the start point 901 and at the end point 902) instead of the inclination of the virtual line in the Y-axis direction in (B1) above, and adjusts the temperature based on the calculated result and an adjustment table 310 created and stored in advance.

Figure 10:
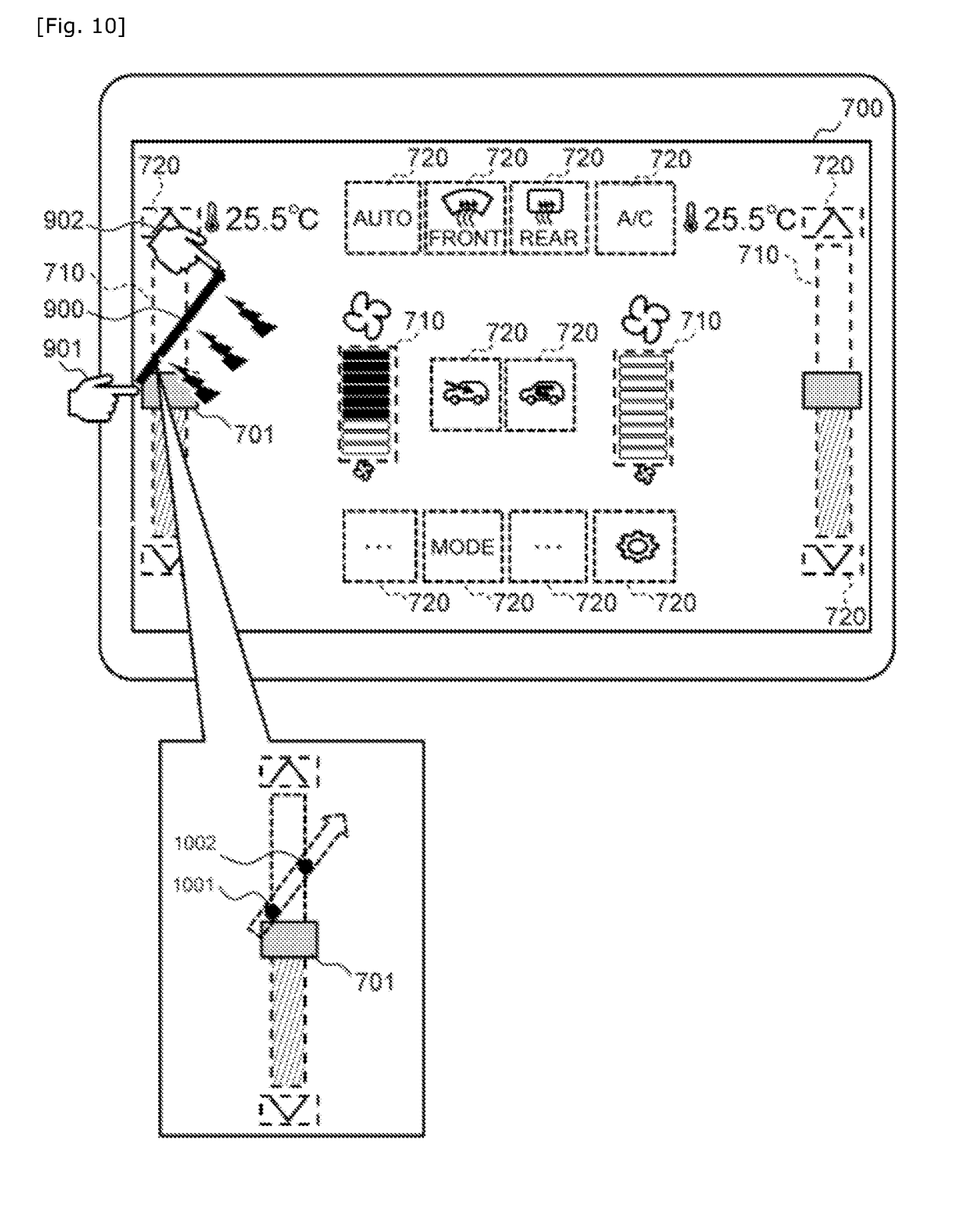
FIG. 10 is a diagram showing an example of a control screen.

In the (B1) and (B2) above, the amount of change in the Y-axis direction was calculated using coordinate information inside and outside of region S. However, the present embodiment is not limited to this example. For example, as shown in FIG. 10, when a touch operation by the user's finger crosses region S, the inclination of the virtual line in the Y-axis direction and the amount of movement in the Y-axis direction may be calculated using two coordinate points detected along the long side of region B (the passing start point 1001 and passing end point 1002).

Figure 6:
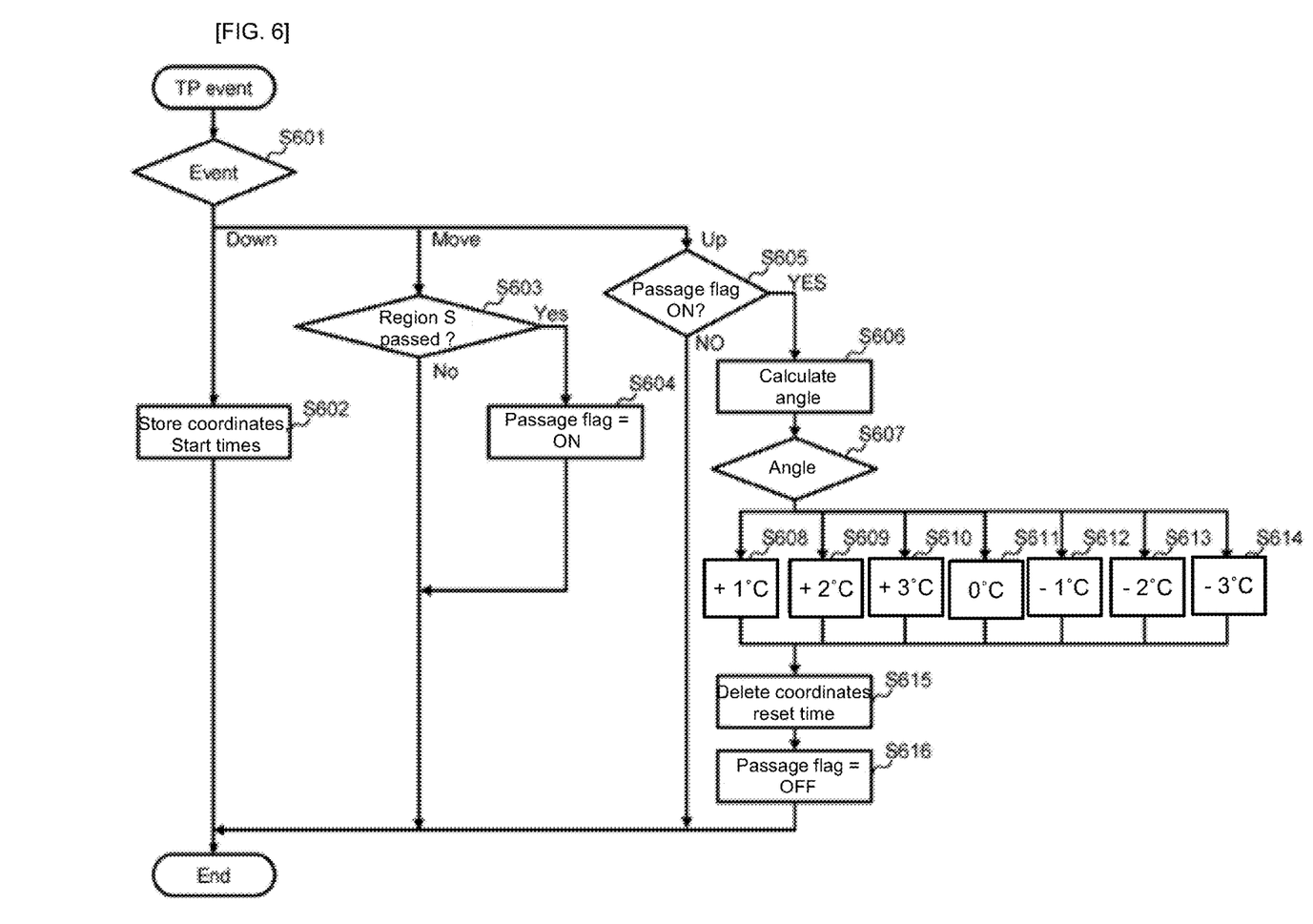
FIG. 6 is a diagram showing an example of temperature adjustment processing.

Next, an example of processing (temperature adjustment processing) performed to adjust the temperature based on a passing operation will be described using FIG. 6. In FIG. 6, the method in (B1) is used.

FIG. 6 is a diagram showing an example of the temperature adjustment process related to the touch sensor in the touch panel 211. Step S601 is executed when an event is detected during a predetermined cycle.

In step S601, when the event that has occurred is a touching touch operation, the control unit 110 advances the process to step S602. When the event that has occurred is a sliding touch operation, it advances the process to step S603. When the event that has occurred is a releasing touch operation, it advances the process to step S605.

In step S602, the control unit 110 stores acquired coordinates in the storage unit 120, starts an internal timer (not shown) in the in-vehicle device 100, and ends the process.

In step S603, when it has been determined from the stored coordinates, the acquired coordinates, and the timer that a touch operation has passed through region S within a predetermined amount of time, the control unit 110 advances the process to step S604. When it has been determined that the touch operation has not passed through region S, it ends the process.

Here, when region S is provided along the edge of the control screen 700 as shown in FIG. 9, a touch operation performed toward the outside of the control screen 700 may not be detected along its route. In other words, the end point of a touch operation toward the inside of the control screen 700 may be detected more accurately than the end point of a touch operation toward the outside of the control screen 700. As a result, the control unit 110 may, for example, determine whether or not the touch operation has passed from the outer side 910 of region S (one example of a boundary line) to the inner side 920 of region S (another example of a boundary line) within a predetermined time. This configuration can be used to determine an adjustment amount that more accurately reflects the intention of the user.

In step S604, the control unit 110 turns ON a flag indicating that the touch operation has passed through region S (the "pass flag" below), and ends the process.

In step S605, the control unit 110 advances the process to step S606 when the pass flag is ON, and ends the process when the pass flag is not ON.

In step S606, the control unit 110 calculates angle Y. For example, the control unit 110 calculates angle Y (the amount of change) in the vertical direction (sliding direction) from the point where the touch operation was detected (the start point) and the point where the touch operation was no longer detected (the end point). In this configuration, angle Y can be calculated by acquiring two points, the start point and the end point of a touch operation, without having to perform calculations using a large number of coordinates from the touch operation (for example, the trajectory).

In step S607, the control unit 110 determines the adjustment amount for the temperature based on the calculated angle Y and the adjustment table 310, and performs the processing in any of steps S608 to S614 based on the determined adjustment amount.

In step S608, the control unit 110 instructs the air conditioner to raise the temperature by 1° C. In step S609, the air conditioner is instructed to raise the temperature by 2° C. In step S610, the control unit 110 instructs the air conditioner to raise the temperature by 3° C. In step S611, the control unit 110 does not issue an instruction to the air conditioner. In step S612, the control unit 110 instructs the air conditioner to lower the temperature by 1° C. In step S613, the control unit 110 instructs the air conditioner to lower the temperature by 2° C. In step S614, the control unit 110 instructs the air conditioner to lower the temperature by 3° C. The air conditioner changes the temperature setting based on instructions from the control unit 110.

In step S615, the control unit 110 discards the stored coordinates and resets the timer.

In step S616, the control unit 110 turns OFF the pass flag and ends the process.

In this way, the control unit 110 instructs the air conditioner to set the temperature according to the position of the knob 701 (one example of an adjustment unit) based on a user touch operation performed to move the knob 701 for adjusting the air conditioner setting in the sliding direction (a predetermined direction) in region S of the control screen 700. The storage unit 120 stores adjustment information 121 in which the amount of change in the sliding direction of the touch operation performed by the user is associated with the adjustment amount for adjusting the setting of the air conditioner. Then, when it has been determined whether a user touch operation has passed through region S within a predetermined amount of time and when it has been determined that the touch operation has passed through region S within the predetermined amount of time, the control unit 110 calculates the amount of change in the touch operation in the sliding direction. The control unit 110 determines the adjustment amount corresponding to the calculated change based on the adjustment information 121, and instructs the air conditioner to change the setting based on the determined adjustment amount. In this configuration, the user can adjust the temperature setting of the air conditioner so that the temperature setting of the air conditioner approaches the intended setting by performing a touch operation that passes through region S without glancing at the control screen 700 even when the user cannot slide the knob 701.

The adjustable setting is at least one of the temperature setting for the air conditioner installed in the vehicle including the in-vehicle device 100, the air flow setting for the air conditioner, the volume setting for the audio equipment built into the in-vehicle device 100, or the volume setting for the audio equipment installed in the vehicle. Using this configuration, the user can adjust the temperature, the air flow, or the volume without glancing at the control screen 700.

The present embodiment is not limited to the configuration described above. For example, an operation can be performed from the time a finger enters region S from outside of the control screen 700 until the finger is released, and the user can be notified of the temperature adjustment using vibration A. In this case, when the amount of change in the Y-axis direction is small and an adjustment of 1° C. is made, vibration A is outputted once. When the amount of change in the Y-axis direction is large and an adjusted of 3° C. is made, vibration A may be outputted once for each 1° C. change (or three times in total). Using this configuration, the user can detect sliding in region B by the user's finger from vibration A without glancing at the control screen 700, making a touch operation for adjusting the temperature possible.

The present embodiment can thus improve the usability of touch operations on a touch panel 211.

(II) Addendum

The embodiment described above includes the following items.

In the embodiment described above, the present invention was applied to an in-vehicle device. However, the present invention is not limited to this and can be applied to other systems, devices, methods, and programs.

In the embodiment described above, some or all of the program may be installed by the source of the program on a device such as a computer used to embody the in-vehicle device. The source of the program may be, for example, a network-connected program distribution server or a computer-readable recording medium (for example, a non-temporary recording medium). In the description provided above, two or more programs may be realized as a single program, or a single program may be realized as two or more programs.

The configurations of the tables in the embodiment described above are just examples. A single table may be divided into two or more tables, or some or all of two or more tables may be provided in a single table.

The screens depicted and described above are just examples. Any design may be used as long as the accepted information is the same.

The screens depicted and described above are just examples. Any design may be used as long as the displayed information is the same.

In the description provided above, the information such as programs, tables, and files used to realize each function can be stored in memory, a storage device such as a hard disk or SSD (solid state drive), or a recording medium such as an IC card, SD card, or DVD.

Modifications, substitutions, combinations, and omissions can be made to the configuration described above when appropriate without departing from the scope and spirit of the present invention.

The items in a list in the form "at least one of A, B, and C" should be understood to mean (A), (B), (C), (A and B), (A and C), (B and C) or (A, B, and C). Similarly, the items in a list in the form "at least one of A, B, or C" should be understood to mean (A), (B), (C), (A and B), (A and C), (B and C) or (A, B, and C).

KEY TO THE DRAWINGS

100: In-vehicle device
110: Control unit

The invention claimed is:

1. An electronic device equipped with an interface unit having a region on a screen that is visible to a user and that can accept touch operations by the user in the region, the region being a subset of the screen for adjusting a setting for a predetermined system, the electronic device comprising:
   a storage unit that stores adjustment information in which an amount of change in a predetermined direction of a touch operation on the screen by the user, has been each associated with an amount of adjustment for adjusting the setting for the predetermined system; and
   a control unit that
      determines whether or not a passing through of the touch operation on the screen through the region in a predetermined amount of time has occurred,
         wherein the passing through is the touch operation starting outside of the region, crossing into the region at least one time and ending outside the region,
      calculates the amount of change in the predetermined direction of the touch operation by the user when it has been determined that passing through of the touch operation by the user through the region within the predetermined amount of time has occurred,
      determines an amount of adjustment corresponding to the calculated amount of change based on the adjustment information, and
      issues an instruction to the predetermined system to adjust the setting relative to a current setting based on the determined amount of adjustment.

2. The electronic device according to claim 1, wherein the control unit instructs the predetermined system to set the setting corresponding to a position of the touch operation when it has been determined that the touch operation is inside the region.

3. The electronic device according to claim 1, wherein the setting value of the predetermined system is a temperature setting value for an air conditioner installed in a vehicle in which the electronic device has been installed, an air flow setting value for the air conditioner, a volume setting value for audio equipment installed in the vehicle, or a volume setting value for the audio equipment.

4. The electronic device according to claim 1, wherein the region is provided at a position away from an edge of the screen by a predetermined interval.

5. The electronic device according to claim 4, wherein the control unit calculates the amount of change in the predetermined direction from a point at which the touch operation by the user was detected and a point at which the touch operation is no longer detected.

6. The electronic device according to claim 5, wherein the control unit determines whether or not the touch operation has passed from an outer boundary line of the region to an inner boundary line of the region within the predetermined time.

7. A non-transitory computer-readable medium for causing a computer, in an electronic device equipped with an interface unit having a region on a screen that is visible to a user and that can accept touch operations by the user in the region, the region being a subset of the screen for adjusting a setting for a predetermined system, and a storage unit that stores adjustment information in which an amount of change in a predetermined direction of a touch operation by a user on the screen has been associated with an amount of adjustment for adjusting the setting for the predetermined system, to execute the steps of:

determining whether or not a passing through of the touch operation on the screen through the region in a predetermined amount of time has occurred;
        wherein the passing through is the touch operation starting outside of the region, crossing into the region at least one time and ending outside the region, calculating the amount of change in the predetermined direction of the touch operation when it has been determined that passing through of the touch operation through the region within the predetermined amount of time has occurred;
    issuing an instruction to the predetermined system to determine an amount of adjustment corresponding to the calculated amount of change based on the adjustment information; and
    adjusting a setting relative to a current setting based on the determined amount of adjustment.

8. A method for using an electronic device equipped with an interface unit having a region on a screen that is visible to a user and that can accept touch operations by the user in the region, the region being a subset of the screen for adjusting a setting for a predetermined system, and a storage unit that stores adjustment information in which an amount of change in a predetermined direction of a touch operation by a user on the screen has been associated with an amount of adjustment for adjusting the setting for the predetermined system, the method including:

determining whether or not a passing through of the touch operation on the screen through the region in a predetermined amount of time has occurred;
        wherein the passing through is the touch operation starting outside of the region, crossing into the region at least one time and ending outside the region,
    calculating the amount of change in the predetermined direction of the touch operation when it has been determined that the touch operation has passed through the region within the predetermined amount of time has occurred;
    issuing an instruction to the predetermined system to determine an amount of adjustment corresponding to the calculated amount of change based on the adjustment information; and
    adjusting a setting relative to a current setting based on the determined amount of adjustment.

\* \* \* \* \*